Jan. 23, 1923.                                                          1,443,294
                        M. L. TRIMMER.
                        DUMPING BODY.
                      FILED APR. 3, 1922.                         2 SHEETS-SHEET 1
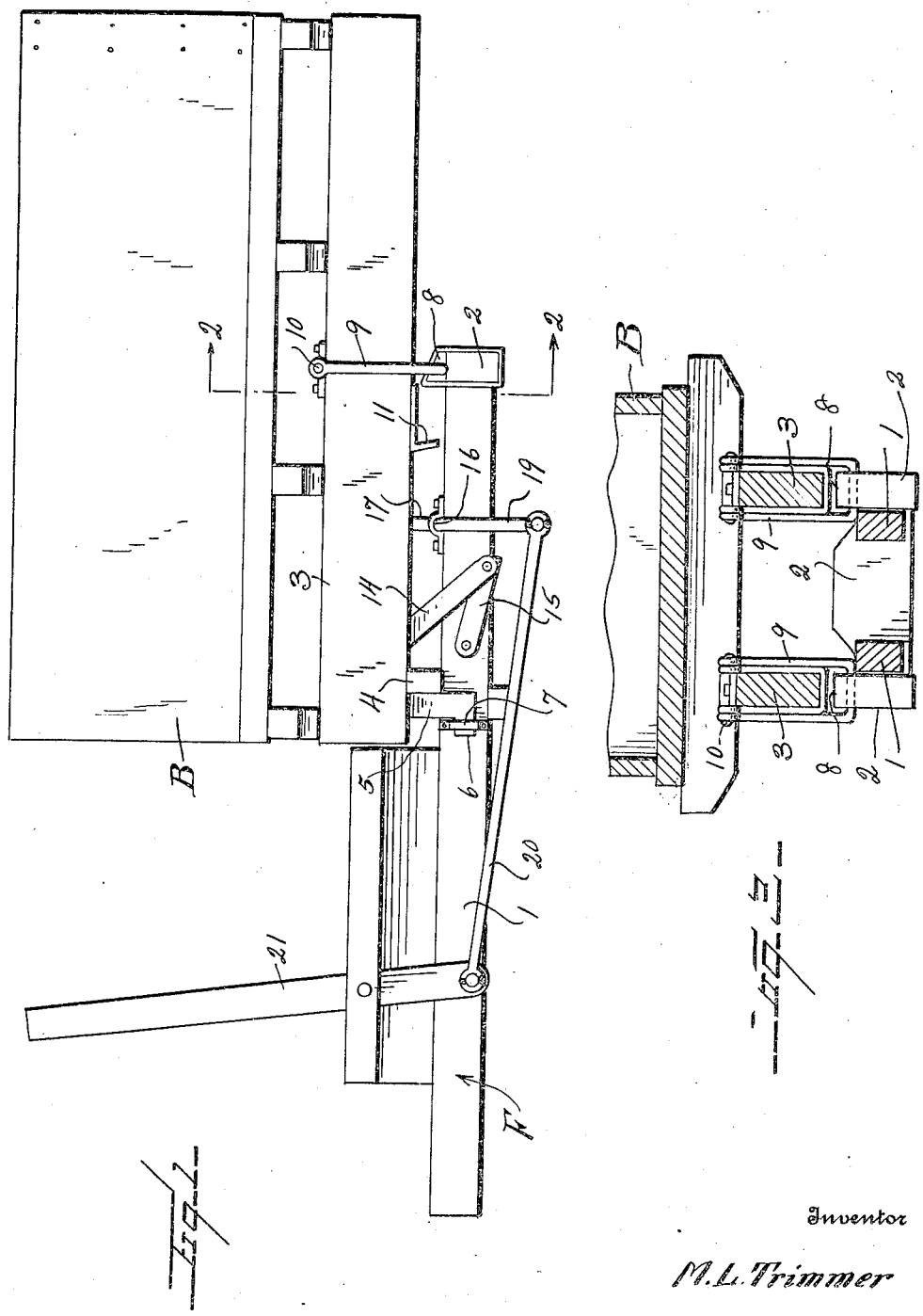

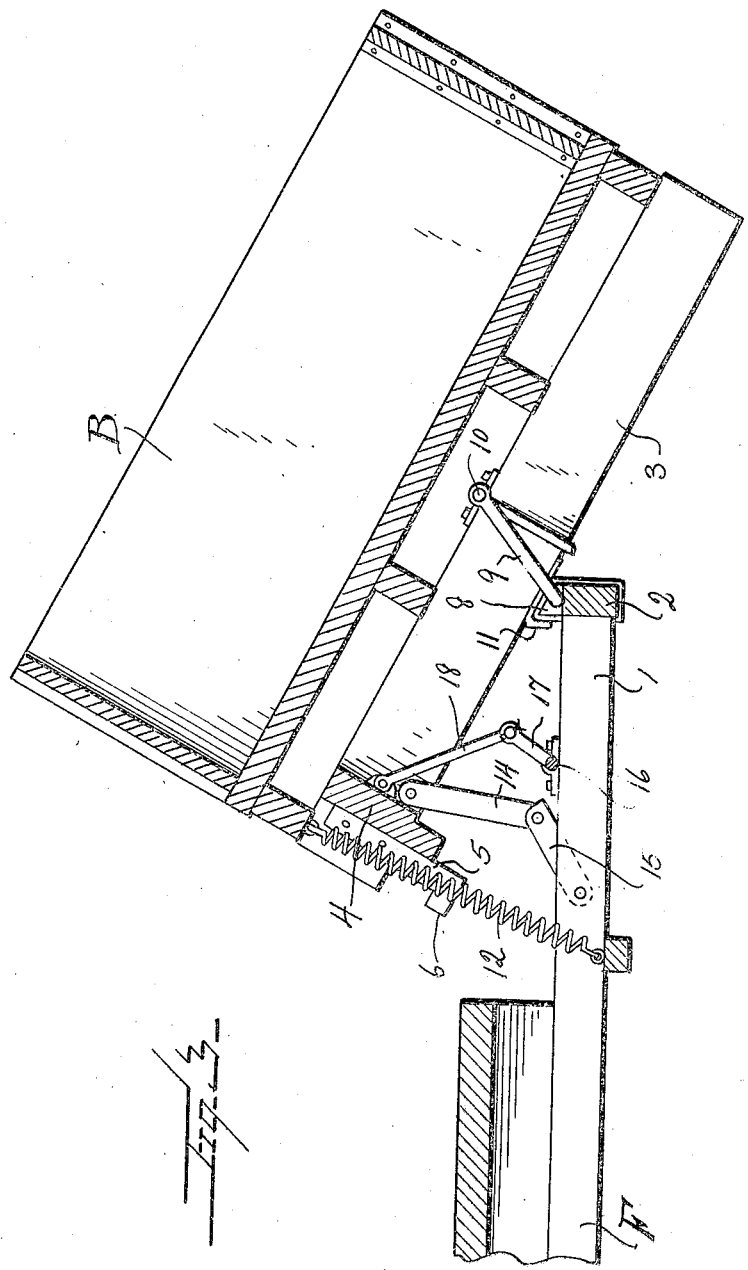

Patented Jan. 23, 1923.

1,443,294

UNITED STATES PATENT OFFICE.

MOSES L. TRIMMER, OF CRAIG, MISSOURI.

DUMPING BODY.

Application filed April 3, 1922. Serial No. 549,040.

*To all whom it may concern:*

Be it known that I, MOSES L. TRIMMER, a citizen of the United States, residing at Craig, in the county of Holt and State of Missouri, have invented certain new and useful Improvements in Dumping Bodies, of which the following is a specification, reference being had to the accompanying drawings.

This invention relates to certain improvements in dumping bodies and has relation more particularly to a device of this general character especially designed and adapted for use in connection with farm and other vehicles, and it is an object of the invention to provide a body having associated therewith novel and improved means whereby said body will be caused to tilt or dump upon shifting of the center of gravity of the body.

Another object of the invention is to provide a dumping body having associated therewith novel and improved means for causing said body to tilt to discharge the load carried thereby, together with means automatically operating to return said body to its normal position.

The invention consists in the details of construction and in the combination and arrangement of the several parts of my improved dumping body whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation illustrating a dumping body and in its normal position;

Figure 2 is a sectional view taken substantially on line 2—2 of Figure 1;

Figure 3 is a longitudinal vertical sectional view taken through the device as illustrated in Figure 1 with the body in a tilting or dumping position.

As disclosed in the accompanying drawings, F denotes the supporting frame of a vehicle comprising a pair of spaced beams 1 connected at their rear ends by the transversely disposed member 2. B denotes a wagon body mounted upon the parallel sills 3, said body extending rearwardly of the frame F and adapted to tilt into dumping position upon shifting of the center of gravity of said body and the load carried thereby.

The forward portions of the sills 3 are connected by a cross member 4 disposed therebelow and which has direct contact with the beams 1 of the frame F when the body B is in its normal position. Also depending from the forward portions of the sills 3 are the arms 5 terminating in the forwardly directed extensions or lugs 6 which extend through the loop members 7 disposed outwardly from the members 1, whereby the body B is effectively locked against tilting or dumping movement.

The member 2 extends beyond each of the members 1 and each of said extended portions is also disposed, as at 8, above the top of the adjacent member 1, the top face of such extension 8 being disposed on a rearward and downward incline. Each of the extended portions 8 has pivotally engaged therewith the base or intermediate portion of an upstanding yoke 9. The upper or free extremities of the side arms of the yoke 9 are pivotally connected, as at 10, with the adjacent sill 3.

Inwardly of the cross member 2, the sills 3 have depending therefrom the lugs 11 which, upon rearward shifting of the body B, contact with the extensions 8 of the member 2, such movement of the body being sufficient to shift the center of gravity of the body and the load carried thereby to cause said body to tilt or swing downwardly to discharge the load carried thereby. Connecting the forward end portion of the body B and the frame F is a retractile member 12 placed under tension as the body B tilts or swings into dumping position, the resultant tension of said spring 12 being sufficient to return the body B to its normal position after the load has been discharged.

Each of the sills 3 has pivotally engaged with the rear portion thereof a link 14 which is also pivotally engaged with a second link 15. This second link 15 is pivotally engaged with a member 1. The links 14 and 15 operate to limit the tilting or dumping movement of the body B yet offer no hindrance or obstruction to said body B returning to or assuming its normal position.

Rotatably supported by the members 1 of the frame F at a point rearwardly of the cross member 4 is a rock shaft 16 provided with an upstanding arm 17. Operatively engaged with the arm 17 is a rigid link 18 which is also pivotally engaged with the cross member 4. By proper rocking movement of the shaft 16, the body B will be shifted rearwardly to effect the desired tilting or dumping movement of the body B or said body B can be moved forwardly to bring the lugs 6 of the arms 5 into locking association with the loop members 7. The shaft 16 is also provided with a depending rock arm 19 which is pivotally engaged through the medium of the rod 20 with the operating lever 21. This lever 21 provides means whereby the body B may be manually shifted as required.

From the foregoing description it is thought to be obvious that a dumping body constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

1. In combination with a frame, a body mounted thereon for sliding movement, upstanding members carried by the frame, depending members carried by the body and contacting with the upstanding members of the frame upon movement of the body in one direction, means pivotally connecting the body and the upstanding members of the frame, and means for shifting the body.

2. In combination with a frame, a body mounted thereon for sliding movement, upstanding members carried by the frame, depending members carried by the body and contacting with the upstanding members of the frame upon movement of the body in one direction, yokes pivotally engaged with the upstanding members of the frame, means for pivotally connecting said yokes to the body, and means for shifting the body.

3. In combination with a frame, a body mounted thereon for sliding movement, an upstanding member carried by the frame, a depending member carried by the body and contacting with the upstanding member of the frame upon movement of the body in one direction, a yoke pivotally engaged with the frame, means for pivotally connecting said yoke to the body, and means for shifting the body.

In testimony whereof I hereunto affix my signature.

MOSES L. TRIMMER.